July 6, 1926.

G. G. ERDOS 1,591,083

INSECT DESTROYER

Filed Feb. 28, 1924

George Geza Erdos
Inventor

Patented July 6, 1926.

1,591,083

UNITED STATES PATENT OFFICE.

GEORGE GEZA ERDOS, OF BROOKLYN, NEW YORK.

INSECT DESTROYER.

Application filed February 28, 1924. Serial No. 695,826.

The present invention relates to insect destroyers of the type wherein vapor is generated and having a nozzle to direct the steam in a jet, so as to concentrate the heat on insects in their hiding places, whereby the insects are killed.

The main object of the invention is to provide a simple and efficient device of this type, which employs an electric heater for generating the steam.

Another object of the invention is to provide a portable apparatus of the type mentioned.

The invention is illustrated in the accompanying drawings, in which:—

Figure 1:
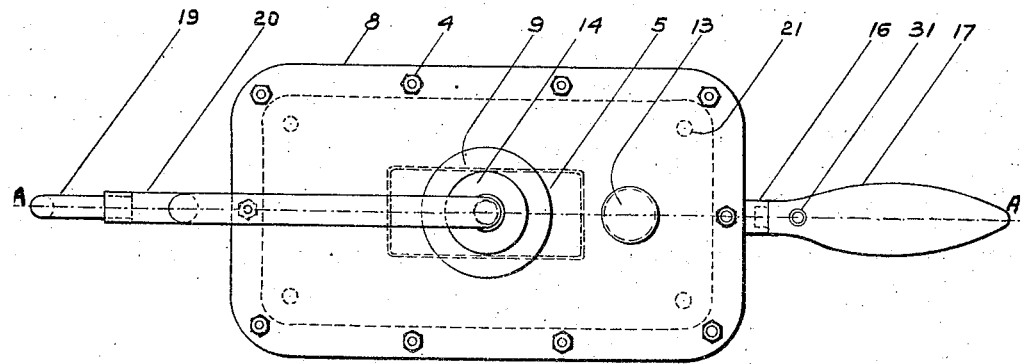
Figure 2:
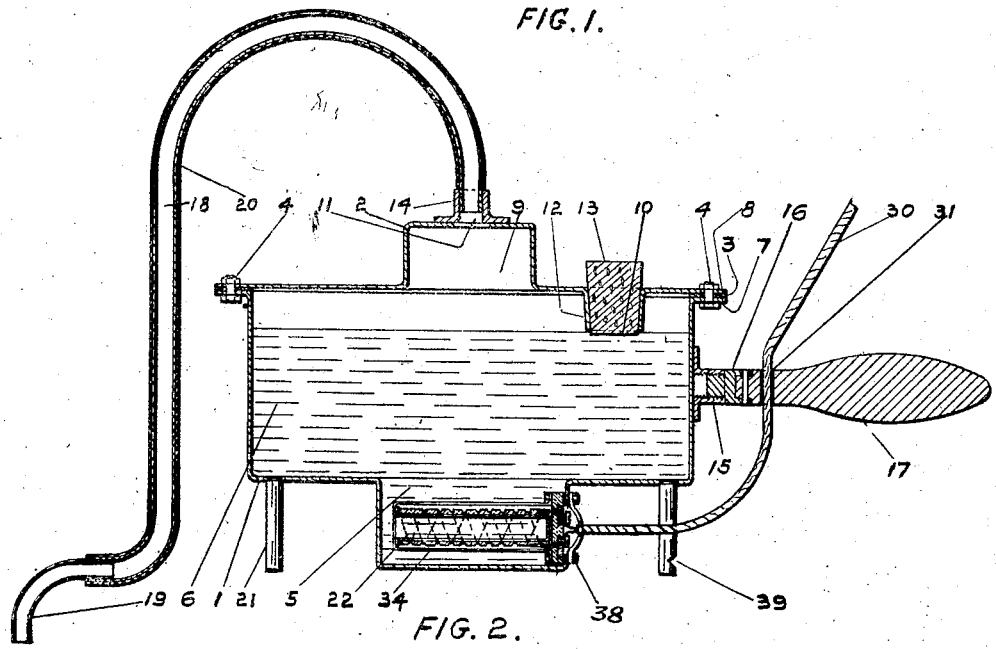
Figure 3:
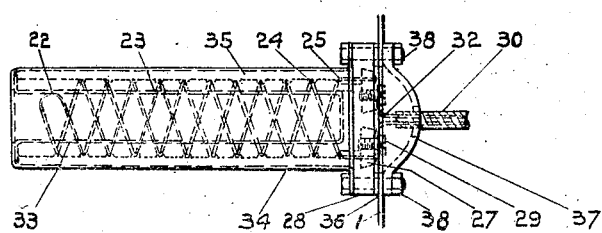

Figure 1 is a top plan view of an insect destroyer constructed in accordance with the present invention; Fig. 2 is a section taken on line A—A of Fig. 1; and Fig. 3 is a side elevation, on a larger scale, of the electric heater.

In the drawings, the numeral 1 indicates a steam boiler, provided with a steam dome 2 in its top. Between the top and the body of the boiler is interposed a gasket 3, the top being united with the said body by screw bolts 4. In the bottom of the boiler is provided a depression 5, which forms a liquid well when the boiler is filled with liquid. In the top of the boiler is formed a filling opening 10, adapted to be closed by a plug 13, for instance in the form of a cork. The dome has an outlet 11, and around this outlet is formed a nipple 14, with which is associated a tube 18. To the free end of this tube is joined a nozzle 19. The tube 18, if made of metal, may be covered with a heat insulating material 20. The boiler is mounted upon legs 21, and has attached to it a handle 17 of heat non-conducting material.

In the depression 5 of the boiler is disposed an electric heater of any suitable construction it including a resistance coil 22, in the form of a spiral, that is wound upon a hollow core 23 of electric insulating material. A flexible electric cable 30 is carried from the coil terminals through an opening 31 in the handle 17, and is adapted to be connected to an electric socket.

The operation of this device is as follows: After the device has been filled to the proper level with water, the electric current is turned on, whereby steam is generated. The steam is directed by means of the nozzle 19 upon the insects in their hiding places, whereby they are killed. It is to be noted that the electric heater is wholly disposed within the well 5, so that the device is insured against over-heating even when only a small amount of liquid remains in the boiler or when the operator fails to hold the contrivance in an upright position. The steam dome on the boiler insures the production of dry steam.

I claim:—

1. A portable insect exterminator comprising a steam boiler provided with a steam dome in its top and with a depression in its bottom to form a liquid well, an electric heater wholly disposed within said well, and a tube provided with a nozzle at its free end connected to said steam dome.

2. A portable insect exterminator according to claim 1, comprising a handle on said boiler, said handle being provided with a hole, and an electric cable leading through said hole to said heater.

In testimony whereof, GEORGE GEZA ERDOS has signed his name to this specification this fifth day of December 1923.

GEORGE GEZA ERDOS.